United States Patent
Ardo (10) Patent No.: US 10,904,560 B2
(45) Date of Patent: Jan. 26, 2021

(54) METHOD AND DEVICE FOR ENCODING A PLURALITY OF IMAGE FRAMES

(71) Applicant: Axis AB, Lund (SE)

(72) Inventor: Bjorn Ardo, Lund (SE)

(73) Assignee: AXIS AB, Lund (SE)

( * ) Notice: Subject to any disclaimer, the term of this patent is extended or adjusted under 35 U.S.C. 154(b) by 0 days.

(21) Appl. No.: 16/700,589

(22) Filed: Dec. 2, 2019

(65) Prior Publication Data

US 2020/0186824 A1    Jun. 11, 2020

(30) Foreign Application Priority Data

Dec. 6, 2018    (EP) .................................... 18210628

(51) Int. Cl.
*H04N 19/17*    (2014.01)
*H04N 19/52*    (2014.01)
*H04N 19/44*    (2014.01)
*H04N 19/167*    (2014.01)

(52) U.S. Cl.
CPC ............ *H04N 19/52* (2014.11); *H04N 19/17* (2014.11); *H04N 19/44* (2014.11); *H04N 19/167* (2014.11)

(58) Field of Classification Search
CPC ...... H04N 19/52; H04N 19/44; H04N 19/167; H04N 19/17
See application file for complete search history.

(56) References Cited

U.S. PATENT DOCUMENTS

| | | | |
|---|---|---|---|
| 6,356,589 B1 | 3/2002 | Gebler et al. | |
| 9,549,180 B2 * | 1/2017 | Chen | .................. H04N 19/513 |
| 10,165,291 B2 * | 12/2018 | Hugosson | ............ H04N 19/436 |
| 10,332,001 B2 * | 6/2019 | Rippel | .................. G06K 9/6256 |
| 10,390,013 B2 * | 8/2019 | Misra | ..................... H04N 19/70 |
| 2007/0133678 A1 * | 6/2007 | Sakai | ..................... H04N 19/82 |
| | | | 375/240.03 |
| 2007/0253490 A1 | 11/2007 | Makino | |
| 2012/0230397 A1 | 9/2012 | Ouedraogo et al. | |
| 2012/0263225 A1 | 10/2012 | Lee | |
| 2013/0136373 A1 | 5/2013 | Sasai et al. | |
| 2014/0369427 A1 | 12/2014 | Duvivier | |
| 2015/0146780 A1 | 5/2015 | Miyoshi et al. | |
| 2016/0156937 A1 | 6/2016 | Yang et al. | |
| 2017/0223377 A1 | 8/2017 | Bankoski et al. | |
| 2020/0186822 A1 * | 6/2020 | Ardo | ..................... H04N 19/436 |
| 2020/0304825 A1 * | 9/2020 | Ardo | ..................... H04N 19/55 |

FOREIGN PATENT DOCUMENTS

EP    2775716 A1    9/2014

OTHER PUBLICATIONS

Wu Y et al: Motion-constrained tile sets SEI message, 13. JCT-VC Meeting; 104. MPEG Meeting; Apr. 18, 2013-Jun. 4, 2013; Incheon; (Joint Collaborative Team on Video Coding of ISO/IEC JTC1/SC29/WG11 and ITU-T SG.16), No. CNC-M0235, Apr. 8, 2013 (Apr. 8, 2013), XP030114192.

* cited by examiner

*Primary Examiner* — Tsion B Owens
(74) *Attorney, Agent, or Firm* — Volpe Koenig (57) ABSTRACT

A method and device for encoding a plurality of image frames uses two separate encoders, where each image frame is divided into two portions to each be encoded by one of the two encoders, where a boundary between the two portions is offset between the image frames according to a size of a search window of one of the encoders. Consequently, copying of pixel data for the purpose of motion search is only required in one direction between a first and a second encoder.

15 Claims, 4 Drawing Sheets

METHOD AND DEVICE FOR ENCODING A PLURALITY OF IMAGE FRAMES

TECHNICAL FIELD

The present invention relates to the field of image encoding. In particular, it relates to a method and device for encoding a plurality of image frames using two separate encoders, where each image frame is divided into two portions to each be encoded by one of the two encoders.

BACKGROUND

In recent years the numbers of monitoring cameras, e.g., network camera monitoring systems, have increased. Similarly, the possible image resolution of an image captured by an image sensor of a monitoring camera has increased. This is advantageous from a monitoring perspective, since more details in the monitored scene may be captured. However, from an encoder perspective, this development has resulted in that an image captured by a high-resolution image sensor may be too large for one encoder (encoder chip) to encode at an acceptable frame rate. Advantageously, the concept of tiles/slices in, e.g., H.265 encoding may be employed to produce a single encoded image from image data encoded by two or more encoders.

A problem arises when motion vectors are to be found, as this means that theoretically, both encoders need to have access to the entire reference frame, requiring copying in both directions between the two encoders. In practice, motion vector search is not performed in the entire reference frame, though, but in a limited search window, in order for the search to be finished in a short enough time to maintain a desired frame rate. Therefore, it will not be necessary to copy the whole reference frame slice or tile from one encoder to the other, but only a sufficiently large portion to accommodate the search window.

Copying image data from the first encoder to the second encoder, and vice versa, is cumbersome. It is also necessary to synchronise to ensure that both encoders have completed a previous image frame before encoding of a new image frame starts.

There is thus a need for improvements within this context.

SUMMARY

In view of the above, overcoming or at least mitigating the problems discussed above would be desirable. In particular, a device and method where copy pixel data for the purpose of motion search for prediction encoding only in one direction between a first and a second encoder.

According to a first aspect, there is provided a method for encoding a plurality of image frames comprising a first image frame and a second image frame, each image frame encoded using a first and a second encoder, the first encoder having a defined size of a first search window for block matching, the method comprising:

dividing image data of the first image frame in a first direction being a horizontal or vertical direction to form a first and second portion of image data;

encoding the first image frame by encoding the first portion of image data using the first encoder, and encoding the second portion of image data using the second encoder;

dividing image data of the second image frame in the first direction to form a third and fourth portion of image data, wherein a position of a boundary between the third and fourth portion of image data in the second image frame is offset in relation to a position of a boundary between the first and second portion of image data in the first image frame, such that a size of the third portion of image data is smaller compared to a size of the first portion of image data, wherein upon the first direction being a horizontal direction, the offset being half a height of the first search window, wherein the boundary is offset in a vertical direction;

wherein upon the first direction being a vertical direction, the offset being half a width of the first search window, wherein the boundary is offset in a horizontal direction; and encoding the second image frame by encoding the third portion of image data using the first encoder, and encoding the fourth portion of image data using the second encoder.

In this disclosure, the term "dividing image data of the first (second third, etc.) image frame in a first direction" generally refers to that the boundary between the portions of image data has a general direction, but that the boundary may be both straight or stepped. For example, for a specific row or column of macroblocks (CTUs) in the image data of an image frame, some of the macroblocks may be part of the first portion of image data, and the remaining macroblocks may be part of the second portion of image data. Generally, the dividing of the image data results in two coherent portions of image data, wherein the first portion of image data may represent a first tile or slice and wherein the second portion of image data may represent a second tile or slice.

The computational burden of having to copy image data between the first encoder and the second encoder may be mitigated by employing a dynamic slice or tile boundary between image frames of a stream of consecutive image frames, such that for the first frame, e.g., 75% of the image frame is encoded in the first encoder and 25% is encoded in the second encoder. The boundary between the two portions of image data is then moved a little (offset) for the next frame, in proportion to the size of the search window and perpendicular to the direction of the boundary. This means that for the second image frame, the size of the portion of the image data (i.e. third portion of image data) encoded by the first encoder is smaller than the size of the portion of the image data (i.e. first portion of image data) encoded by the first encoder for the first image frame, and that the reduction has been made according to the direction of the boundary. Accordingly, the size of the portion of image data encoded by the second encoder is increased between the first and second image frame. Thus, for the second image frame, e.g. 75% minus half the search window of the first encoder is encoded in the first encoder, and 25% plus half the search window of the first encoder is encoded in the second encoder. As mentioned above, depending on if the image data is divided in a horizontal or vertical direction, the height or the width of the search window is used for defining the offset, and the boundary is offset in a direction perpendicular to the direction of the boundary between the portions of image data. This way of dynamically moving the boundary between the two portions of image data results in that the (first) encoder that is encoding gradually shrinking slices or tiles will not need any data from the other (second) encoder for inter frame encoding. With the above embodiment, it is ensured that, for the first encoder, pixel data corresponding to the whole search window is already available at the first encoder, using the image data that was encoded by the first encoder with the previous placement of the boundary (for, e.g., the previous image frame, or reference frame, among the plurality of image frames).

Moreover, the above embodiment may result in that synchronization requirements between the two encoders are relaxed. If both encoders would need image data from the other encoder for inter encoding purposes, both encoders must have finished encoding at least relevant areas of a reference frame before copying over image data to the other encoder. With the above embodiments, where the first encoder does not need (encoded and then decoded) image data from the other encoder, the synchronization requirements are thus relaxed, as will be described further below.

An advantageous side effect of the above embodiment is that deblocking for the respective portions of the first and second image frame will move in relation to each other between the first and second image frame, resulting in an improved visual quality of the later decoded stream of images.

Yet another advantage of the present embodiment is that separate encoders (chips) with separate buffer memories (for reference encoding purposes) may be used, reducing complexity and cost.

According to some embodiments, wherein the second image frame is inter frame encoded, wherein the second encoder has a defined size of a second search window for block matching, the method further comprises the step of:

dividing the first portion of image data in the first direction, to form a first and second sub-portion of image data, wherein the first sub-portion consists of image data of the first portion of image data being adjacent to the second portion of image data, wherein upon the first direction being a horizontal direction, the first sub-portion having a height equal to half the height of the first search window plus half the height of the second search window;

upon the first direction being a vertical direction, the first sub-portion having a width equal to half the width of the first search window plus half the width of the second search window;

wherein the encoding the first portion of image data using the first encoder comprises encoding the first sub-portion of image data to form a first sub-portion of encoded image data, wherein the method further comprises the steps of:

decoding, by the first encoder, the first sub-portion of encoded image data to form a first sub-portion of decoded data, and copying the first sub-portion of decoded image data from the first encoder to the second encoder.

As described above, the second encoder would need data from the first encoder for inter encoding purposes of the fourth portion of image data. By the above embodiment, a low complexity process for copying enough image data (in relation to the search window size of the first and second encoder, and the direction in which the image data of the image frames are divided) to the second encoder is achieved. The copied data (the decoded version of the encoded first sub-portion of image data) is put in the buffer memory (reference buffer memory, reference memory, etc.) in the second encoder used for inter encoding together with the decoded version of the encoded second portion of image data, which may then be used as reference data when inter encoding the fourth portion of image data. As described above, for the first encoder, it is enough to use the decoded version of the encoded first portion of image data for the purpose of inter encoding of the third portion of image data. The size of the first and second search window may be equal, or different.

According to some embodiments, after the step of copying the first sub-portion of decoded image data from the first encoder to the second encoder, the first and second encoders operate independently of each other when encoding the third and fourth portion of image data, respectively.

In this disclosure, the term "first and second encoder operate independently of each other" generally means that no further communication or transfer of data is necessary between the first and second encoder for the defined purpose (i.e. encoding the third and fourth portion of image data). In other words, only the second portion of image data and the first sub-portion of image data (encoded and decoded again) may be used as reference data for block matching when performing inter-frame encoding of the fourth portion of image data. As described above, for the first encoder, it is enough to use the decoded version of the encoded first portion of image data for the purpose of inter encoding of the third portion of image data. Consequently, after copying the first sub-portion of decoded image data from the first encoder to the second encoder, the first and second encoder can operate independently of each other when inter encoding the third and fourth portion of image data (and similar for any subsequent image frames encoded using this process).

According to some embodiments, the steps of decoding, by the first encoder, the first sub-portion of encoded image data to form a first sub-portion of decoded data, and copying the first sub-portion of decoded image data from the first encoder to the second encoder are performed as soon as the encoding of the first sub-portion of image data by the first encoder is complete. As described above, advantageously, the synchronization requirements between the first and second encoder may be relaxed with the invention. By performing the copying as soon as possible, the second encoder may start to inter encode the fourth portion of image data as early as possible, thus reducing latency for the encoding process.

According to some embodiments, encoding the first portion of image data using the first encoder is starting at a point in time before the encoding the second portion of image data using the second encoder is started. Since the first encoder will not need to copy any image data from the second encoder for the purpose of encoding the first portion of the first image frame or any subsequent corresponding portions while the slice/tile is gradually shrinking according to the above, the synchronization requirements are relaxed and the first encoder may start to encode the first portion prior to the second encoder having started to encode the second portion, without necessarily having to wait with encoding the third portion (second image frame) until the second encoder has finalized encoding its part (second portion of image data) of the first image frame. Thus according to some embodiments, encoding the third portion of image data using the first encoder is starting at a point in time before the encoding the second portion of image data using the second encoder is finished.

According to some embodiments, the method comprises iteratively performing the method according to the first aspect for image frames subsequent to the first and second image frame in the plurality of image frames and being part of a same Group Of Pictures, GOP, as the first and second image frame, such that the position of the boundary between the two portions of image data of the image frames of the GOP is gradually moved over the image frames of the GOP. This means that for all image frames of the GOP, the part (portion) of image data of each image frame of the GOP encoded by the first encoder is gradually shrinking, which means that for the entire GOP, no data needs to be copied from the second encoder to the first encoder. According to some embodiments, for a subsequent GOP, the dividing of image data of the first image frame of this subsequent GOP is performed as for the first image frame for the first GOP, in the same direction to form a first and second portion of image data, and using the same initial proportions as for the first image frame of the first GOP. In other embodiments, the proportions and/or directions are changed, e.g., to improve or change balancing of work between the encoders or for other reasons.

According to some embodiments, the first image frame is intra frame encoded and the first image frame is the first image in a Group Of Pictures, GOP. Advantageously, the method may then comprise the step of setting the position of the boundary between the first and second portion of image data of the first image frame based on the size of the first search window, the first direction and the length of the GOP, such that a computational load of the first and second encoder is balanced during the GOP. In this embodiment, the load on the encoders may advantageously be balanced such that they on average do an equal amount of work.

According to some embodiments, the method further comprises the step of determining the GOP length based on the size of the first search window such that, for a final image frame in the GOP, a size of the portion of image data encoded by the first encoder exceeds a first threshold. Advantageously, the GOP length may be set such that that a computational load of the first and second encoder is balanced during the GOP, e.g. such that the first threshold corresponds to the size of the second portion of image data (encoded by the second encoder for the first image frame of the GOP). According to other embodiments, the first threshold is set such that the computational load otherwise is shared according to some decision, i.e. such that the first encoder does more work, or less work, according to some predetermined proportions. In this embodiment, a suitable size of the first search window may be defined, and the GOP length is set based on this, which provides a more flexible encoding method.

According to some embodiments, the first encoder is arranged to receive image data encoded by the second encoder and to form an encoded image, the encoded image comprising the image data encoded by the first encoder as a first tile or a first slice and the image data encoded by the second encoder as a second tile or a second slice. In this embodiment, it is the first encoder that multiplexes the two streams into a single stream, and thus the load on the PCIe bus may be more balanced since the first encoder sends data for inter encoding purposes to the second encoder, while the second encoder sends encoded data to the first encoder for multiplexing the two streams to a single stream. Moreover, the first encoder may in this embodiment function as a master chip while the second encoder may function as a slave chip, simplifying the division of tasks between the encoders for the purpose of encoding of the plurality of image frames.

According to a second aspect a computer program product comprises a computer-readable medium with computer code instructions adapted to carry out the method of the first aspect when executed by a device having processing capability.

According to a third aspect is a device comprises a first and second encoder, the device configured to encode a plurality of image frames comprising a first image frame and a second image frame, each image frame encoded using the first and a second encoder, the first encoder having a defined size of a first search window for block matching, the device comprising a processor configured to:

divide image data of the first image frame in a first direction being a horizontal or vertical direction to form a first and second portion of image data;

encode the first image frame by encoding the first portion of image data using the first encoder, and encoding the second portion of image data using the second encoder;

divide image data of the second image frame in the first direction to form a third and fourth portion of image data, wherein a position of a boundary between the third and fourth portion of image data in the second image frame is offset in relation to a position of a boundary between the first and second portion of image data in the first image frame, such that a size of the third portion of image data is smaller compared to a size of the first portion of image data, wherein upon the first direction being a horizontal direction, the offset being half a height of the first search window, wherein the boundary is offset in a vertical direction;

wherein upon the first direction being a vertical direction, the offset being half a width of the first search window, wherein the boundary is offset in a horizontal direction; and encode the second image frame by encoding the third portion of image data using the first encoder, and encoding the fourth portion of image data using the second encoder.

According to a fourth aspect a system comprises:

a video capturing device adapted to continuously capture a video sequence depicting a scene;

a device according to the third aspect adapted to continuously receive a sequence of image frames from the video capturing device, encode the sequence of image frames, and output the encoded sequence of image frames.

According to some embodiments, the device is integrated in the video capturing device.

The second, third and fourth aspects may generally have the same features as the first aspect. It is further noted that all possible combinations of features unless explicitly stated otherwise are contemplated.

BRIEF DESCRIPTION OF THE DRAWINGS

The above, as well as additional features will be better understood through the following illustrative and non-limiting detailed description of preferred embodiments, with reference to the appended drawings, where the same reference numerals will be used for similar elements wherein.

DETAILED DESCRIPTION OF EMBODIMENTS

The present embodiments will now be described more fully hereinafter with reference to the accompanying drawings. The systems and devices disclosed herein will be described during operation.

In newer encoding methods, e.g., Advanced Video Coding (AVC) (also called H.264) and High Efficiency Video Coding (HEVC) (also called H.265), the concept of tiles (only supported by HEVC encoding) and slices has been introduced. Tiles and slices allow for the image to be divided into a grid of rectangular (or substantially rectangular, as will be described below) regions that can be independently decoded/encoded. To be independently codable, there shall not be any predictions using pixels from more than one slice or tile, and the results from the prediction shall only be used in the same slice or tile. This concept may be used for parallel processing purposes, to let separate encoders or cores of an encoder encode an image frame in parallel. In this disclosure, separate encoders (a first and second encoder), having separate buffer memories for reference encoding (inter encoding, P-frame encoding, B-frame encoding), are employed, using the concept of tiles/slices to encode an image frame. In this setup, a problem arises when motion vectors are to be found, as this means that theoretically, both encoders need to have access to the entire reference frame, or at least the part needed according to the size of the search window. The present disclosure is aimed at an encoding method which only requires copying data from one encoder to the other for reference encoding purposes, but does not require copying in the other direction for the same purpose. As described above, this may be accomplished by utilizing a slice or tile boundary that changes dynamically between image frames of a stream of consecutive image frames, such that for a determined number of image frames (for example a GOP, or half a GOP, etc.) the portion of image data encoded in, e.g., the first encoder is gradually decreased according to the size of the search window of the first encoder. For the second encoder, more data needs to be copied from the first encoder than if the boundary were left as is throughout the plurality of image frames, but the advantage of not having to copy data in the other direction outweighs any disadvantage of having to copy a bit more data from the first encoder to the second encoder. For example, as described above and further below, synchronization requirements between the two encoders are relaxed. If both encoders would need image data from the other encoder for inter encoding, both encoders need to finalize encoding at least relevant areas of a reference frame before copying over image data to the other encoder. This requirement is removed with the encoding method described herein.

Figure 1A:
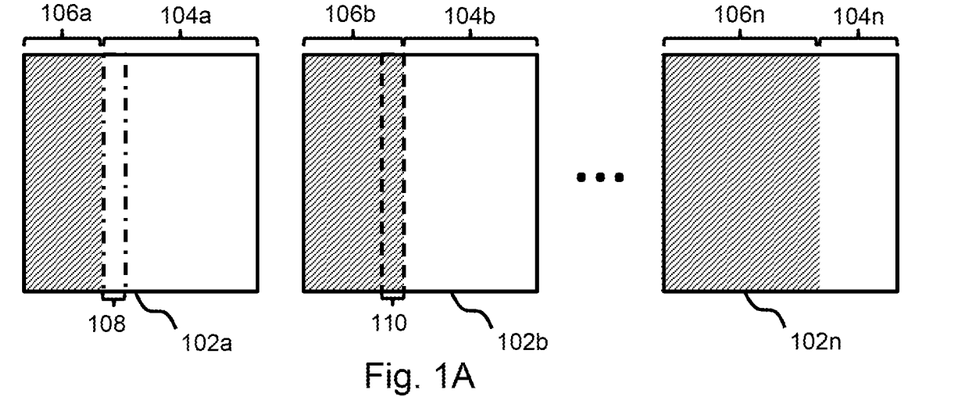
FIGS. 1A-C each show examples of a gradually shrinking portion of each image frame encoded by a first encoder and a gradually expanding portion of each image frame encoded by a second encoder.
Figure 1B:
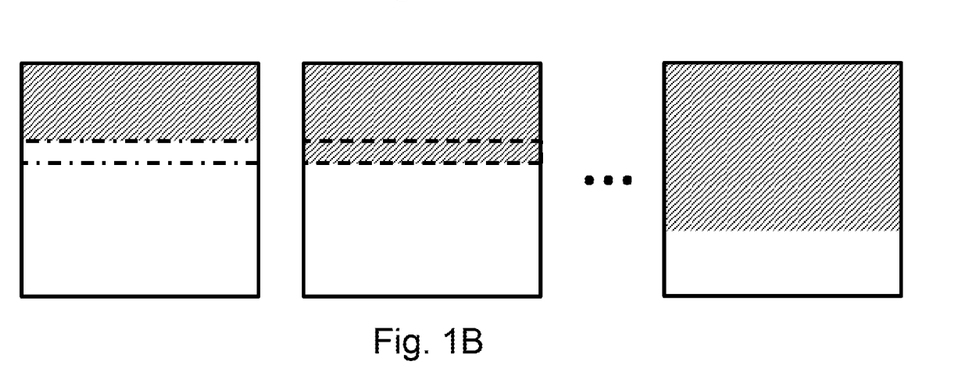
Figure 1C:
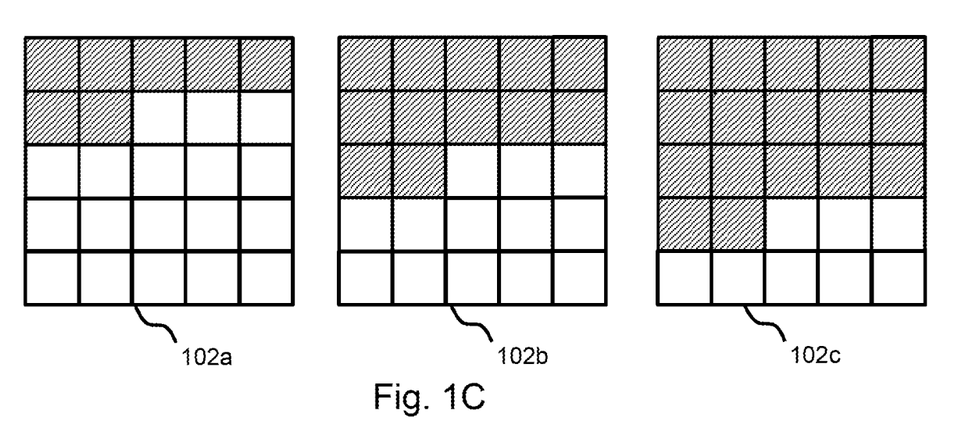

FIGS. 1A-C show examples of a gradually shrinking portion of each image frame encoded by a first encoder and a gradually expanding portion of each image frame encoded by a second encoder. In FIGS. 1A-C, a grey area 106 represents image data encoded by the second encoder and a white area 104 represents image data encoded by the first encoder. In FIG. 1A, a first image frame 102a, a second image frame 102b and an n-th image frame 102n are shown by way of example. In this embodiment, image data of the plurality of image frames 102a-n is divided in a vertical direction. Image data of the first image frame 102a is thus divided in a vertical direction to form a first 104a and second 106a portion of image data. For the second image frame 102b, image data is divided in the vertical direction to form a third 104b and fourth 106b portion of image data. A position of a boundary between the third and fourth portion of image data in the second image frame 102b is offset in relation to a position of a boundary between the first and second portion of image data in the first image frame. The offset is shown in the second image frame 102b as a dashed area 110. The offset 110 corresponds to half a width of the search window of the first encoder (encoding the white areas 104 of the image frames 102a-n), and the boundary is offset in a horizontal direction. This means that a size of the third portion 104b of image data is smaller compared to a size of the first portion 104a of image data. By offsetting the boundary in this way, no copying of data from the second encoder to the first encoder for the purpose of inter encoding of the third portion 104b of image data is necessary.

For the purpose of inter encoding of the fourth portion 106b of image data, copying of image data from the first encoder is however necessary. Consequently, in the embodiment where the fourth portion 106b of image data is to be inter encoded, the first portion 104a of image data is divided in the vertical direction, to form a first 108 and second sub-portion of image data, wherein the first sub-portion 108 consists of image data of the first portion 104a of image data being adjacent to the second portion 106a of image data, and have the width equal to half the width of the search window of the second encoder plus half the width of the search window of the first encoder. The sub-portion 108 of image data is encoded and decoded again by the first encoder, and the decoded image data corresponding to the sub-portion 108 of the first portion 104a of image data is then copied over to the second encoder to be used as reference data together with the decoded version of the second portion 106a of image data for inter encoding of the fourth portion 106b of image data.

Consequently, after copying as described above, the first and second encoders may operate independently of each other when encoding the third portion 104b and the fourth portion 106b of image data of the second image frame 102b, since all necessary data for inter encoding are present in the respective buffer memory of the separately arranged first and second encoder.

As shown in FIG. 1A, for all image frames between the second image frame 102b and the n-th image frame 102n, the gradual movement of the boundary between the portions of image data encoded by the two encoders has been iteratively performed, such that the position of the boundary between the two portions of image data of the image frames 102a-n is gradually moved over the image frames 102a-n. The plurality of image frames 102a-n may in some embodiments correspond to a Group Of Pictures, GOP. In some embodiments, the first image frame 102a corresponds to the first image frame of the GOP and is as such intra-encoded.

As also shown in FIG. 1A, for the n-th image frame 102n, the proportions of the portions 104n, 106n of image data encoded by the two encoder have been inverted. For example, the proportions of the first image frame 102a reflect that 80% of the image data is encoded by the first encoder and 20% of the image data is encoded by the second encoder, while for the n-th image frame, the proportions are inverted to 20% and 80%. In this embodiment, a computational load of the first and second encoder is balanced during the encoding of the plurality of image frame 102a-n.

By moving the position of the boundary corresponding to half the size of the search window used by the first encoder, it is ensured that the first encoder will have access to the image data needed for encoding all blocks in the third portion 104b of the second frame 102b from encoding and decoding the first frame 102a. Even a macroblock at the very edge of the third portion 104b, next to the boundary, will be possible to search for in an entire first search window in the data available in the first encoder from the first frame 102a. As the boundary is gradually moved corresponding to half the size of the search window, the portion to be encoded by the first encoder gradually shrinks, thereby ensuring that enough image data for a search with the first search window is available from encoding and decoding the previous frame. If the boundary were static, there would be a need for copying reference data from the second encoder to the first encoder for each frame for enabling motion vector searches also for blocks next to the boundary, but by moving the position of the boundary by half a search window from one frame to the next, such copying is unnecessary.

In some embodiments, the proportions of the division of image data of the first image frame 102a is made such that for the final image frame 102n (which may be the last image frame of a GOP), the proportions of the division of image data is inverted. In this embodiment, the boundary between the first 104a and second 106a portion of image data is thus set based on the size of the search window of the first encoder (in this embodiment, the width of the search window since the direction of the boundary is vertical), and the number of image frames (n in this case) during which the boundary should be gradually moved before starting over again, such that the computational load of the first and second encoder is balanced during the encoding of the plurality of image frames 102a-n. However, if n is large, this would mean that the boundary is moved all the way to the other end of the image data and beyond. Consequently, according to some embodiments, n (for example the length of the GOP) is set such that, for a defined size of the search window for the first encoder, for the final image frame 102n among the plurality of image frames 102a-n, a size of the portion of image data encoded by the first encoder exceeds a first threshold. According to some embodiments, n is set such that a computational load of the first and second encoder is balanced during the plurality of image frames 102a-n. For example, in FIG. 1A, if the width of the search window of the first encoder means that the boundary will be moved such that the portion of the image data encoded by the first encoder is reduced by 5% for each image frame, and the proportions of the first image frame 102a reflects that 70% of the image data is encoded by the first encoder and 30% of the image data is encoded by the second encoder, and the first threshold is set to 30% (a computational load of the first and second encoder is balanced during the plurality of image frames), n would equal 9. If the portion of the image data encoded by the first encoder is reduced by 10% for each image frame, n would equal 5, etc.

FIG. 1B shows the same scenario as FIG. 1A, but where the division of image data in the respective image frame is made in horizontal direction.

In FIGS. 1A-B, the boundaries between the portions of image data encoded by the first and second encoders are shown as straight boundaries. However, it should be noted that a stepped boundary is equally possible, which is shown in FIG. 1C. H.264 and H.265 support such shaped slices/tiles, and consequently, a portion of image data as described herein is not restricted to a shape of a quadrangle. As shown in FIG. 1C, for a specific row of macroblocks/CTUs (shown as squares in FIG. 1C) in the image data of an image frame, some of the macroblocks may be part of the first portion of image data, and the remaining macroblocks may be part of the second portion of image data. For example, for the first image frame 102a, the macroblocks of the second row are divided between the first portion of image data and the second portion of the image data. For the second image frame 102b, the boundary has been moved by one macroblock, and consequently, the macroblocks of the third row are divided between the third portion of image data and the fourth portion of the image data. The third image frame 102c, which in this embodiment represents the final image frame (of, e.g., the GOP), the boundary has been moved by yet another macroblock in a vertical direction (i.e. perpendicular to the direction of the boundary).

Figure 2:
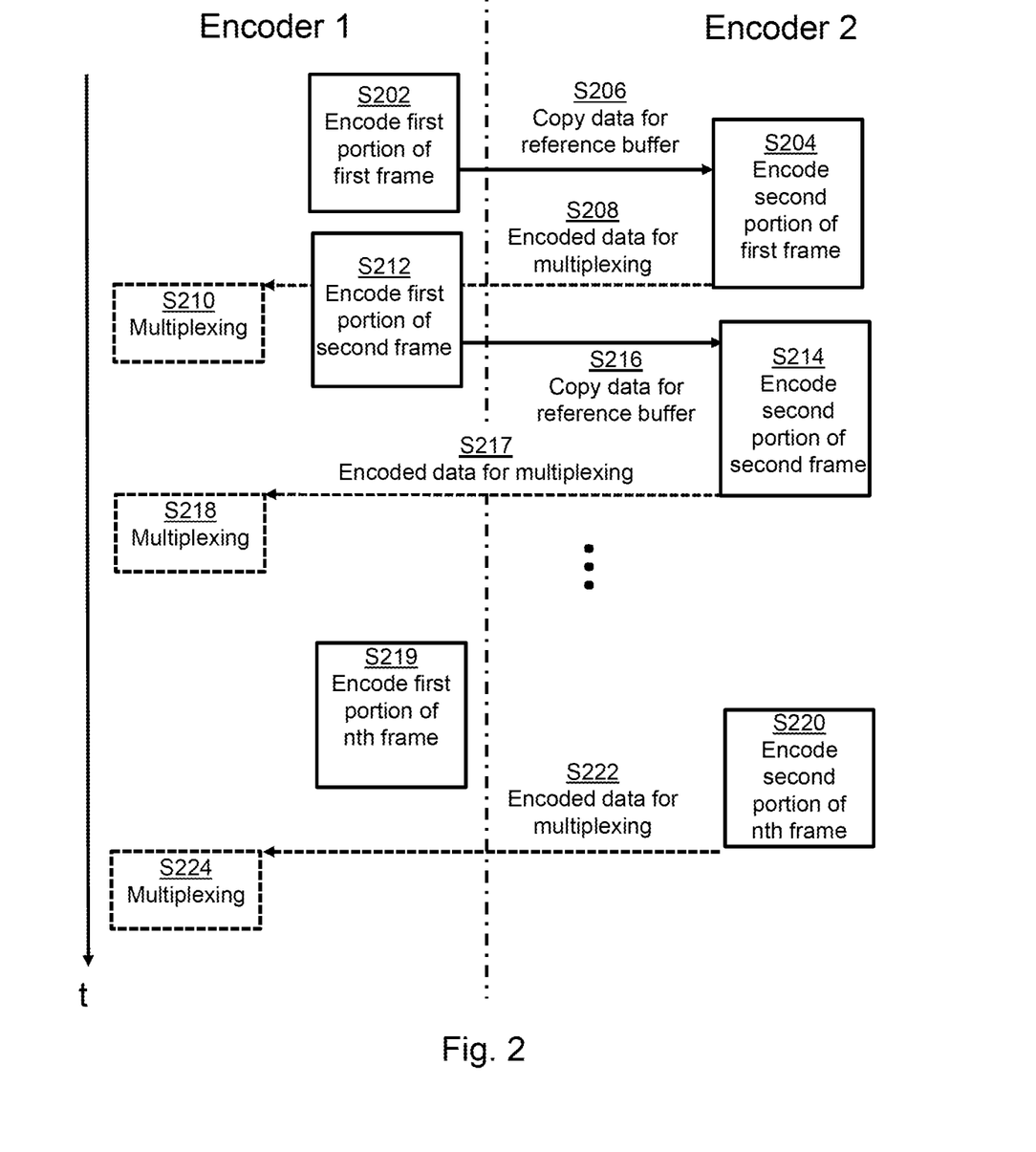
FIGS. 2-3 show methods for encoding a plurality of image frames comprising a first image frame and a second image frame according to embodiments.

FIG. 2 shows by way of example a timeline of the steps of an encoding method for encoding a plurality of image frames as described above. The steps performed by the first encoder is shown to the right in FIG. 2 (to the right of the dashed dotted line) and the steps performed by the second encoder is shown to the left in FIG. 2 (to the left of the dashed dotted line).

By removing the requirement of copying data from the second encoder to the first encoder, the synchronization requirements between the first and second encoder are relaxed. This is exemplified in FIG. 2. Moreover, in the example of FIG. 2, the first encoder functions as a master encoder in that the first encoder is arranged to receive S208, S217, S222 image data encoded by the second encoder and to form S210, S218, S224 (multiplexing) an encoded image, the encoded image comprising the image data encoded by the first encoder as a first tile or a first slice and the image data encoded by the second encoder as a second tile or a second slice. In FIG. 2, the multiplexing functionality S210, S218, S224 is performed by a separate core/thread in the first encoder, and thus not delaying, e.g., the encoding S212 of the first portion of the second image frame. This is an optional feature, and according to other embodiments, the multiplexing functionality S210, S217, S224 is performed between the encoding of image frames by the first encoder.

In the embodiment of FIG. 2, encoding S202 the first portion of image data using the first encoder is starting at a point in time before the encoding S204 the second portion of image data using the second encoder is started. In FIG. 2, encoding S212 of the third portion of image data (referred to in FIG. 2 as the first portion of the second image frame) using the first encoder is starting at a point in time before the encoding S204 the second portion of image data using the second encoder is finished. In some embodiments, the encoding S212 the third portion of image data using the first encoder is starting at a same point in time as the encoding S204 of the second portion of image data using the second encoder is started, or even before the encoding S204 of the second portion of image data using the second encoder is started. This is made possible, as described above, by the fact that the first encoder does not need any data copied from the second encoder for the purpose of inter encoding.

The method of FIG. 2 further comprises the steps S206, S216 of copying data for the reference encoding purposes from the first encoder to the second encoder. According to some embodiments, the copying S206, S216 may be performed as soon as the encoding of the required portion of image data in the first encoder is completed, i.e. before the encoding S202, S212 of the entire portion of the image data by the first encoder is completed. Advantageously, latency may hereby be reduced.

Figure 3:
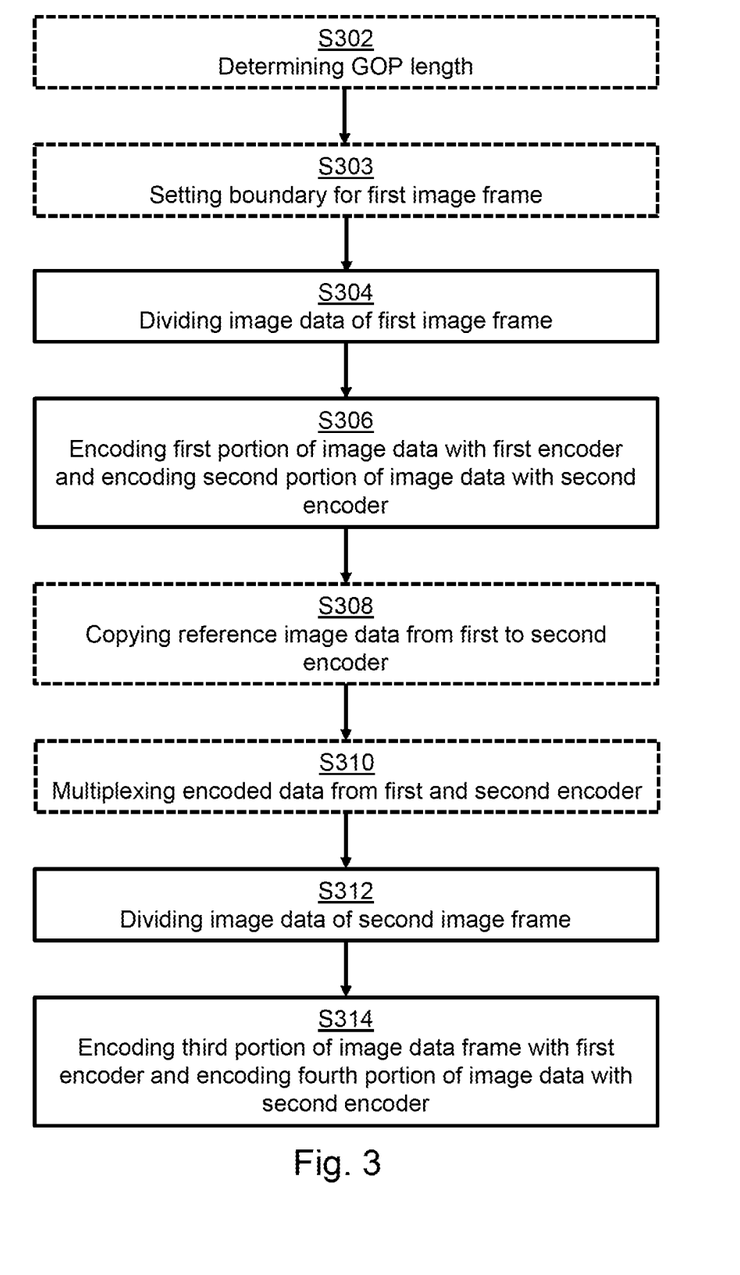
Figure 4:
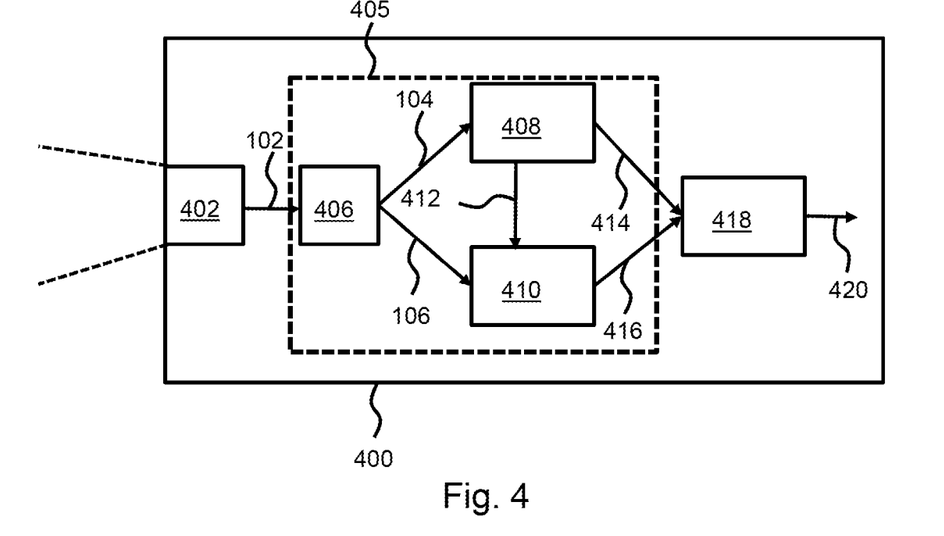
FIGS. 4 and 5 show devices for encoding a plurality of image frames comprising a first image frame and a second image frame according to embodiments.
Figure 5:
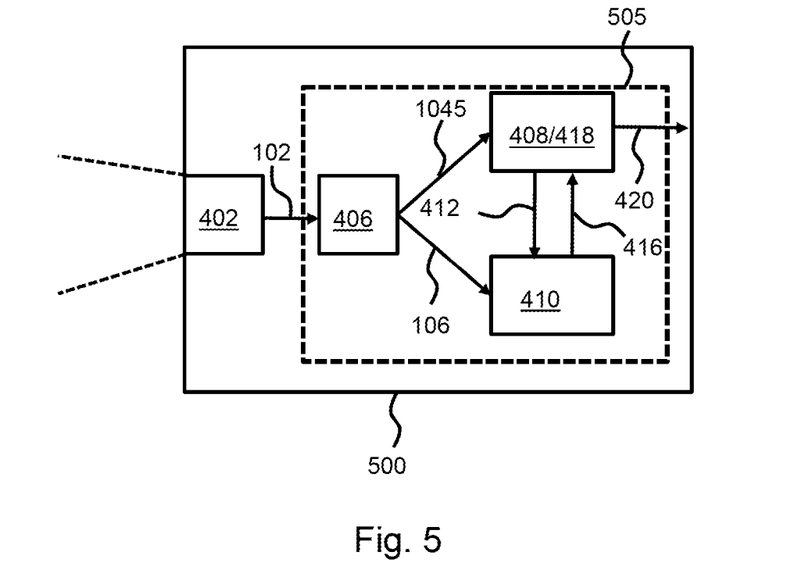

A device comprising a first and second encoder, the device configured to encode a plurality of image frames comprising a first image frame and a second image frame (according to above) will now be further described in conjunction with FIGS. 3-5. Embodiments of such a device 405, 505 are shown in FIGS. 4-5, wherein the device 405, 505 are adapted to perform the method of FIG. 3 and other embodiments described above. In FIGS. 4 and 5, the device 405, 505, is integrated in a video capturing device 400, 500. However, according to other embodiments, the device is separately arranged from the video capturing device, and connected to the video capturing device through, e.g., a wired or wireless network. In any event, in the examples of FIGS. 4-5, the device 405, 505 is adapted to continuously receive a sequence of image frames 102 from the video capturing device 400, 500 (i.e. captured by an image sensor 402 of the video capturing device 400, 500, and depicting a scene). In other embodiments, the device receives a pre-recorded sequence of image frames, and encodes them as described herein.

The device 405, 505 comprises at least one processor (not shown) configured to perform the method, e.g., described by way of example in FIG. 3, and to control the two encoders 408, 410 of the device 405, 505 to encode the plurality of image frames 102 as described herein.

Optionally, the processor is configured to determine S302 a GOP length, as described above, based on the size of the first search window such that, for the final image frame in the GOP, a size of the portion of image data encoded by the first encoder 408 exceeds a first threshold.

Optionally, the processor is configured to setting S303 the position of the boundary between the first and second portion of image data of the first image frame based on the size of the first search window, the first direction and the length of the GOP, such that a computational load of the first and second encoder is balanced during the GOP.

The processor is configured to divide S304 image data of the first image frame in a first direction being a horizontal or vertical direction to form a first 104 and second 106 portion of image data.

The processor is further configured to control encoding S306 of the first image frame by encoding the first portion of image 104 data using the first encoder, and encoding the second portion 106 of image data using the second encoder.

In FIG. 4, the encoded data 414 from the first encoder 408, and the encoded data 416 from the second encoder are sent to a separate multiplexer 418 for forming (multiplexing) an encoded image stream 420, each image in the encoded image stream 420 comprising image data 104 encoded by the first encoder 408 as a first tile or a first slice and image data 106 encoded by the second encoder 410 as a second tile or a second slice.

In the embodiment of FIG. 5, the first encoder functions as the multiplexer 418. In this embodiment, the processor is configured to control the second encoder 410 to transmit the encoded data 416 to the first encoder. In other words, in the embodiment of FIG. 5, the first encoder is arranged to receive image data 416 encoded by the second encoder and to form S310 an encoded image stream 420, each encoded image in the encoded image stream 420 comprising image data 104 encoded by the first encoder as a first tile or a first slice and image data 106 encoded by the second encoder as a second tile or a second slice.

Moreover, the processor may further be configured to copy S308 reference image data 412 from the first encoder 408 to the second encoder 410, as described above.

The encoders 408, 410 each comprise a separate buffer memory (not shown) where image data used for reference encoding (inter encoding, P-frame, B-frame etc.) is stored and continuously replaced.

Additionally, variations to the disclosed embodiments can be understood and effected by the skilled person in practicing the claimed invention, from a study of the drawings, the disclosure, and the appended claims. For example, an image sensor 402 described herein may be adapted to capture image data of the size of 15-20 Megapixels per image frame, for which size the methods of this disclosure are particularly advantageous. However, other sizes of the captured image frames may apply.

Further, although embodiments have been described in the context of splitting one image into two or more portions, the same principles may be used for producing one image from two or more image sensors.

In the description and drawings, two encoders are used. However, the encoding may be done splitting the image data into more than two slices or tiles, using more than two encoders.

The first search window and the second search window may be of equal size. However, in some instances, it may be beneficial to limit the search in one encoder more, using a smaller search window, and to allow the other encoder to search in a larger search window, for example if the load on one encoder is higher than on the other encoder.

The first and second search windows may each be of fixed size, but it would also be possible to use dynamically varying search window sizes. The lengths of motion vectors encoded in one or more image frames may be used for determining the size of the search window for subsequent image frames. For instance, if the encoded motion vectors are below a threshold length, the search window size may be decreased, and the GOP length may be increased in order to improve encoding efficiency.

Moreover, in the drawings and specification, there have been disclosed preferred embodiments and examples and, although specific terms are employed, they are used in a generic and descriptive sense only and not for the purpose of limitation, the scope being set forth in the following claims. In the claims, the word "comprising" does not exclude other elements or steps, and the indefinite article "a" or "an" does not exclude a plurality.

The invention claimed is:

1. A method for encoding a plurality of image frames comprising a first image frame and a second image frame, each image frame encoded using a first and a second encoder, the first encoder having a defined size of a first search window for block matching, the method comprising:

dividing image data of the first image frame in a first direction being a horizontal or vertical direction to form a first and second portion of image data;

encoding the first image frame by encoding the first portion of image data using the first encoder, and encoding the second portion of image data using the second encoder;

dividing image data of the second image frame in the first direction to form a third and fourth portion of image data, wherein a position of a boundary between the third and fourth portion of image data in the second image frame is offset in relation to a position of a boundary between the first and second portion of image data in the first image frame, such that a size of the third portion of image data is smaller compared to a size of the first portion of image data, wherein upon the first direction being a horizontal direction, the offset being half a height of the first search window, wherein the boundary is offset in a vertical direction;

wherein upon the first direction being a vertical direction, the offset being half a width of the first search window, wherein the boundary is offset in a horizontal direction; and encoding the second image frame by encoding the third portion of image data using the first encoder, and encoding the fourth portion of image data using the second encoder.

2. The method of claim 1, wherein the second image frame is inter frame encoded, wherein the second encoder has a defined size of a second search window for block matching, wherein the method further comprises the step of:

dividing the first portion of image data in the first direction, to form a first and second sub-portion of image data, wherein the first sub-portion consists of image data of the first portion of image data being adjacent to the second portion of image data, wherein upon the first direction being a horizontal direction, the first sub-portion having a height equal to half the height of the first search window plus half the height of the second search window;

upon the first direction being a vertical direction, the first sub-portion having a width equal to half the width of the first search window plus half the width of the second search window;

wherein the encoding the first portion of image data using the first encoder comprises encoding the first sub-portion of image data to form a first sub-portion of encoded image data, wherein the method further comprises the steps of:

decoding, by the first encoder, the first sub-portion of encoded image data to form a first sub-portion of decoded data, and copying the first sub-portion of decoded image data from the first encoder to the second encoder.

3. The method of claim 2, wherein, after the step of copying the first sub-portion of decoded image data from the first encoder to the second encoder, the first and second encoder operate independently of each other when encoding the third and fourth portion of image data, respectively.

4. The method of claim 2, wherein the steps of decoding, by the first encoder, the first sub-portion of encoded image data to form a first sub-portion of decoded data, and copying the first sub-portion of decoded image data from the first encoder to the second encoder are performed as soon as the encoding of the first sub-portion of image data by the first encoder is complete.

5. The method of claim 1, wherein encoding the first portion of image data using the first encoder is started at a point in time before the encoding the second portion of image data using the second encoder is started.

6. The method of claim 1, wherein encoding the third portion of image data using the first encoder is started at a point in time before the encoding the second portion of image data using the second encoder is finished.

7. The method of claim 1, comprising iteratively performing the method for image frames subsequent to the first and second image frame in the plurality of image frames and being part of a same Group Of Pictures, GOP, as the first and second image frame, such that the position of the boundary between the two portions of image data of the image frames of the GOP is gradually moved over the image frames of the GOP.

8. The method of claim 1, wherein the first image frame is intra frame encoded and wherein the first image frame is the first image in a Group Of Pictures, GOP.

9. The method of claim 7, further comprising the step of setting the position of the boundary between the first and second portion of image data of the first image frame based on the size of the first search window, the first direction and the length of the GOP, such that a computational load of the first and second encoder is balanced during the GOP.

10. The method of claim 7, further comprising the step of determining a length of the GOP based on the size of the first search window such that, for the final image frame in the GOP, a size of the portion of image data encoded by the first encoder exceeds a first threshold.

11. The method of claim 1, wherein the first encoder is arranged to receive image data encoded by the second encoder and to form an encoded image, the encoded image comprising the image data encoded by the first encoder as a first tile or a first slice and the image data encoded by the second encoder as a second tile or a second slice.

12. The method of claim 8, further comprising the step of setting the position of the boundary between the first and second portion of image data of the first image frame based on the size of the first search window, the first direction and the length of the GOP, such that a computational load of the first and second encoder is balanced during the GOP.

13. The method of claim 8, further comprising the step of determining a length of the GOP based on the size of the first search window such that, for the final image frame in the GOP, a size of the portion of image data encoded by the first encoder exceeds a first threshold.

14. A device comprising a first and second encoder, the device configured to encode a plurality of image frames comprising a first image frame and a second image frame, each image frame encoded using the first and a second encoder, the first encoder having a defined size of a first search window for block matching, the device comprising a processor configured to:

divide image data of the first image frame in a first direction being a horizontal or vertical direction to form a first and second portion of image data;

encode the first image frame by encoding the first portion of image data using the first encoder, and encoding the second portion of image data using the second encoder of;

divide image data the second image frame in the first direction to form a third and fourth portion of image data, wherein a position of a boundary between the third and fourth portion of image data in the second image frame is offset in relation to a position of a boundary between the first and second portion of image data in the first image frame, such that a size of the third portion of image data is smaller compared to a size of the first portion of image data, wherein upon the first direction being a horizontal direction, the offset being half a height of the first search window, wherein the boundary is offset in a vertical direction;

wherein upon the first direction being a vertical direction, the offset being half a width of the first search window, wherein the boundary is offset in a horizontal direction; and encode the second image frame by encoding the third portion of image data using the first encoder, and encoding the fourth portion of image data using the second encoder.

15. A system comprising:

a video capturing device adapted to continuously capture a video sequence depicting a scene and encode a plurality of image frames comprising a first image frame and a second image frame; and an encoding device comprising a first encoder and a second encoder, the device configured to encode each image frame encoded using the first and a second encoder, the first encoder having a defined size of a first search window for block matching, the encoding device including a processor configured to:

divide image data of the first image frame in a first direction being a horizontal or vertical direction to form a first and second portion of image data;

encode the first image frame by encoding the first portion of image data using the first encoder, and encoding the second portion of image data using the second encoder of;

divide image data of the second image frame in the first direction to form a third and fourth portion of image data, wherein a position of a boundary between the third and fourth portion of image data in the second image frame is offset in relation to a position of a boundary between the first and second portion of image data in the first image frame, such that a size of the third portion of image data is smaller compared to a size of the first portion of image data, wherein upon the first direction being a horizontal direction, the offset being half a height of the first search window, wherein the boundary is offset in a vertical direction;

wherein upon the first direction being a vertical direction, the offset being half a width of the first search window, wherein the boundary is offset in a horizontal direction; and encode the second image frame by encoding the third portion of image data using the first encoder, and encoding the fourth portion of image data using the second encoder.

* * * * *